(12) United States Patent
Crombie et al.

(10) Patent No.: US 11,013,657 B2
(45) Date of Patent: May 25, 2021

(54) MOBILITY DEVICE

(71) Applicants: John Crombie, East Hanover, NJ (US); Jessica Liberatore, San Mateo, CA (US)

(72) Inventors: John Crombie, East Hanover, NJ (US); Jessica Liberatore, San Mateo, CA (US)

(*) Notice: Subject to any disclaimer, the term of this patent is extended or adjusted under 35 U.S.C. 154(b) by 0 days.

(21) Appl. No.: 16/512,568

(22) Filed: Jul. 16, 2019

(65) Prior Publication Data

US 2019/0350795 A1 Nov. 21, 2019

Related U.S. Application Data

(62) Division of application No. 15/204,807, filed on Jul. 7, 2016, now Pat. No. 10,398,619.

(Continued)

(51) Int. Cl.
*A61H 3/00* (2006.01)
*A41D 1/00* (2018.01)
(Continued)

(52) U.S. Cl.
CPC ............ *A61H 3/008* (2013.01); *A41D 1/089* (2018.01); *A41D 13/0007* (2013.01); *A41D 13/0015* (2013.01); *A63B 21/00181* (2013.01); *A63B 21/068* (2013.01); *A63B 21/16* (2013.01); *A63B 21/4009* (2015.10); *A63B 21/4011* (2015.10); *A63B 21/4033* (2015.10);
(Continued)

(58) Field of Classification Search
CPC .............. A61H 3/008; A61H 2201/163; A61H 2201/0161; A61H 2201/1652; A41D 13/0015; A41D 2300/22; A41D 1/08; A41D 1/089; A41D 13/0007; A63B 21/00181; A63B 21/4009; A63B 21/4011; A63B 21/4033; A63B 21/068; A63B 21/16; A63B 22/20; A63B 69/0057; A63B 69/0062; A63B 2225/093; A63B 2210/50; A63B 21/4025; A63B 21/4047; A63B 21/00047; A63B 21/00065; A63B 21/0552; A63B 21/0557; A63B 23/047; A63B 71/023; A63B 2071/027; A63B 2208/0204; A63B 2208/029; A63B 2209/10; A63B 2210/56; B32B 3/266; B32B 3/30; B32B 5/022; B32B 25/04; B32B 2255/00; B32B 2307/744; B32B 2307/746

See application file for complete search history.

(56) References Cited

U.S. PATENT DOCUMENTS 339,650 A * 4/1886 Hill ..................... A61H 3/008
                                                    482/69
1,703,375 A * 2/1929 Volk .................... A63B 69/0059
                                                    473/216

(Continued)

*Primary Examiner* — Garrett K Atkinson

(57) ABSTRACT

A garment attachable to an exercise or therapeutic apparatus that is capable of elevating the user slightly above the ground, reducing potential for injury and strain by shifting the user's weight to the frame of the apparatus. The garment is incorporated into the apparatus by comprising panels under the buttocks and around the thighs, providing balance and lifting the user comfortably in conjunction with the frame. A low-friction plate is positioned under the user's feet so that the user can ambulate freely while held in place by the frame.

3 Claims, 6 Drawing Sheets

Related U.S. Application Data

(60) Provisional application No. 62/189,786, filed on Jul. 8, 2015.

(51) Int. Cl.

| | | |
|---|---|---|
| *A41D 1/089* | (2018.01) | |
| *A63B 21/00* | (2006.01) | |
| *A63B 21/068* | (2006.01) | |
| *A63B 21/16* | (2006.01) | |
| *A63B 22/20* | (2006.01) | |
| *A63B 69/00* | (2006.01) | |
| *B32B 3/26* | (2006.01) | |
| *B32B 3/30* | (2006.01) | |
| *B32B 5/02* | (2006.01) | |
| *B32B 25/04* | (2006.01) | |
| *A63B 21/012* | (2006.01) | |
| *A63B 21/055* | (2006.01) | |
| *A63B 23/04* | (2006.01) | |
| *A63B 71/08* | (2006.01) | |
| *A41D 1/08* | (2018.01) | |
| *A41D 13/00* | (2006.01) | |
| *A63B 71/02* | (2006.01) | |

(52) U.S. Cl.
CPC .......... *A63B 22/20* (2013.01); *A63B 69/0057* (2013.01); *B32B 3/266* (2013.01); *B32B 3/30* (2013.01); *B32B 5/022* (2013.01); *B32B 25/04* (2013.01); *A41D 1/08* (2013.01); *A41D 2300/22* (2013.01); *A61H 2201/0161* (2013.01); *A61H 2201/163* (2013.01); *A61H 2201/1652* (2013.01); *A63B 21/00047* (2013.01); *A63B 21/00065* (2013.01); *A63B 21/012* (2013.01); *A63B 21/0552* (2013.01); *A63B 21/0557* (2013.01); *A63B 21/4025* (2015.10); *A63B 21/4047* (2015.10); *A63B 23/047* (2013.01); *A63B 69/0062* (2020.08); *A63B 71/023* (2013.01); *A63B 2071/027* (2013.01); *A63B 2208/0204* (2013.01); *A63B 2208/029* (2013.01); *A63B 2209/10* (2013.01); *A63B 2210/50* (2013.01); *A63B 2210/56* (2013.01); *A63B 2225/093* (2013.01); *B32B 2255/00* (2013.01); *B32B 2307/744* (2013.01); *B32B 2307/746* (2013.01)

(56) References Cited

U.S. PATENT DOCUMENTS

| | | | | |
|---|---|---|---|---|
| 2,812,010 | A * | 11/1957 | Abdallah | A61H 3/008 482/69 |
| 4,114,873 | A * | 9/1978 | Jones | A63B 69/0022 482/139 |
| 4,340,215 | A * | 7/1982 | Murphy | A61H 3/008 104/62 |
| 4,976,623 | A * | 12/1990 | Owsley | A63B 69/0064 434/247 |
| 5,033,460 | A * | 7/1991 | Goldish | A61H 1/0218 606/241 |
| 5,147,265 | A * | 9/1992 | Pauls | A63B 21/015 482/115 |
| 5,176,597 | A * | 1/1993 | Bryne | A63B 69/0057 482/74 |
| 5,403,253 | A * | 4/1995 | Gaylord | A63B 21/068 482/140 |
| 5,526,893 | A * | 6/1996 | Higer | A61H 3/04 180/65.1 |
| 5,626,540 | A * | 5/1997 | Hall | A61H 1/0229 482/69 |
| 5,667,461 | A * | 9/1997 | Hall | A61H 1/0229 472/15 |
| D399,272 | S * | 10/1998 | Zwonitzer | D21/683 |
| 5,941,807 | A * | 8/1999 | Cassidy | A63B 22/14 482/130 |
| 6,099,447 | A * | 8/2000 | Ramsaroop | A63B 21/153 482/107 |
| 6,890,288 | B2 * | 5/2005 | Bingham | A47D 13/046 482/69 |
| 7,131,936 | B2 * | 11/2006 | Schlosser | A61H 3/008 482/69 |
| 7,294,094 | B1 * | 11/2007 | Howie | A61H 3/00 135/67 |
| 7,338,418 | B2 * | 3/2008 | Erez | A63B 69/0059 119/770 |
| 7,341,543 | B2 * | 3/2008 | Dandy | A63B 22/20 280/271 |
| 7,651,450 | B2 * | 1/2010 | Wehrell | A61H 1/0229 482/124 |
| 7,780,587 | B2 * | 8/2010 | Thornton | A61H 3/04 482/143 |
| 7,996,935 | B1 * | 8/2011 | Chen | A45F 3/22 5/127 |
| 9,239,616 | B1 * | 1/2016 | Carrell | A63C 17/1436 |
| 9,259,603 | B2 * | 2/2016 | Wireman | A63B 71/023 |
| 9,370,680 | B1 * | 6/2016 | Macaulay | A63B 21/0552 |
| 9,452,102 | B2 * | 9/2016 | Ledea | A61H 3/008 |
| 10,232,209 | B2 * | 3/2019 | Pouchet | A63B 23/03575 |
| 2007/0015641 | A1 * | 1/2007 | Demeniuk | A63B 21/4017 482/124 |

\* cited by examiner

MOBILITY DEVICE

CROSS-REFERENCE TO RELATED APPLICATIONS

This application is a divisional of U.S. application Ser. No. 15/204,807, which claims the benefit of U.S. Provisional Appl. No. 62/189,786.

FIELD OF THE INVENTION

The invention lies in the field of rehabilitation and exercise devices.

BACKGROUND

Orthopedic physical therapy and athletic training may seek to reduce the amount of joint and muscle strain by countering the effects of gravity upon the body. This can be accomplished by structural supports that the user can rest against. Some suspension frames aim to lift the user, shifting the user's weight to the suspension frame and off of the ground. Suspension frames are beneficial in the case of lower body rehabilitation because of the reduction of strain on the muscles and joints of the legs.

Ambulation therapy may be desirable in the case of lower body injuries or neurological damage that compromises the patient's balance. In addition, ambulation therapy may be useful for athletic training to lower the risk of said lower body injuries. Ambulation therapy devices typically use moving treadmills in combination with a means of suspension. In order to support the full weight of a human body and include a mechanical treadmill for ambulation, these devices are typically extremely heavy and have a large footprint. As a result, they are often too large and too expensive for ordinary consumer purchase. Similarly, modest training facilities, gyms and physical therapy centers may be unable to afford existing therapy device.

Currently known ambulation therapy devices use air or harnesses for buoyancy. For instance, U.S. Pat. No. 7,341,543 to Dandy discloses an apparatus for shifting the body weight of a runner from the runner's legs to a wheeled frame using a pelvic harness that is secured to the frame with an elastic material. Another example, the AlterG® Anti-Gravity Treadmill®, suspends the user on an inflatable cushion, which the user must enter into from the top of the machine. Securing the user in these devices can be dangerous, burdensome and inefficient, and moreover, involve straps and fabric that press into parts of the body uncomfortably as the user is suspended above the ground.

SUMMARY

An exercise and physical therapy device is described comprising a suspension frame and garment combination that is easy to enter and comfortable for the user when lifted by the frame. The garment is structured so that it distributes the user's weight to the frame effectively while minimizing uncomfortable pressure from the garment as the user's body strains against the garment due to gravity. The garment comprises an elastic fabric such that the user can ambulate freely, and several integrated support panels comprised of a less elastic material, such that due to their resistance to deformation the support panels integrate with the frame and lift the user. The garment comprises thigh support panels that fit the thigh snugly and connect to the suspension frame at waist level, causing the suspension frame to lift the user from the thigh support panels. This alleviates pressure as the user's body strains against the garment due to gravity, concentrating any squeezing effect at the thigh. Furthermore, the garment comprises a posterior support panel, which connects to the suspension frame at waist level, lifting the user from under the buttocks and counterbalancing the thigh panels that lift the user from the front.

The device also comprises a wheeled or stationary suspension frame comprising a waist-level ring to which the garment connects, and which is vertically movable. The ring surrounds the user at waist level, attaches to the garment, and can elevate a user wearing the garment slightly off of the ground, thus enabling the user to ambulate while minimizing impact on the user's lower body. Because the ring is lowerable, the user can safety and comfortably enter the ring and/or step into the garment.

The frame may be wheeled, or it may be fixed in place such that the user is held in place by the frame. The wheeled embodiment comprises hinges to allow vertical adjustment of the suspension ring. The fixed embodiment may be comprised of a hydraulic suspension ring, or any other means for vertical movement of the suspension ring. In the preferred stationary embodiment, the frame is collapsible, comprising on each side: rotatably connected legs that form an X-frame that expands and collapses due to operation of a mechanical actuator.

Where the stationary frame is used, the device can also include a low-friction plate that is positionable under the user's feet, enabling the user to ambulate in place, sliding against the low-friction plate as though it were the ground. The low-friction surface eliminates the need for a costly and oversized treadmill. Furthermore, through the addition of slidable layers of resistance, the friction of the surface may be adjustable. Adjustable friction controls resistance against the user's feet and therefore can serve as an incremental therapy or training device.

DETAILED DESCRIPTION

Figures 1A, 1B:
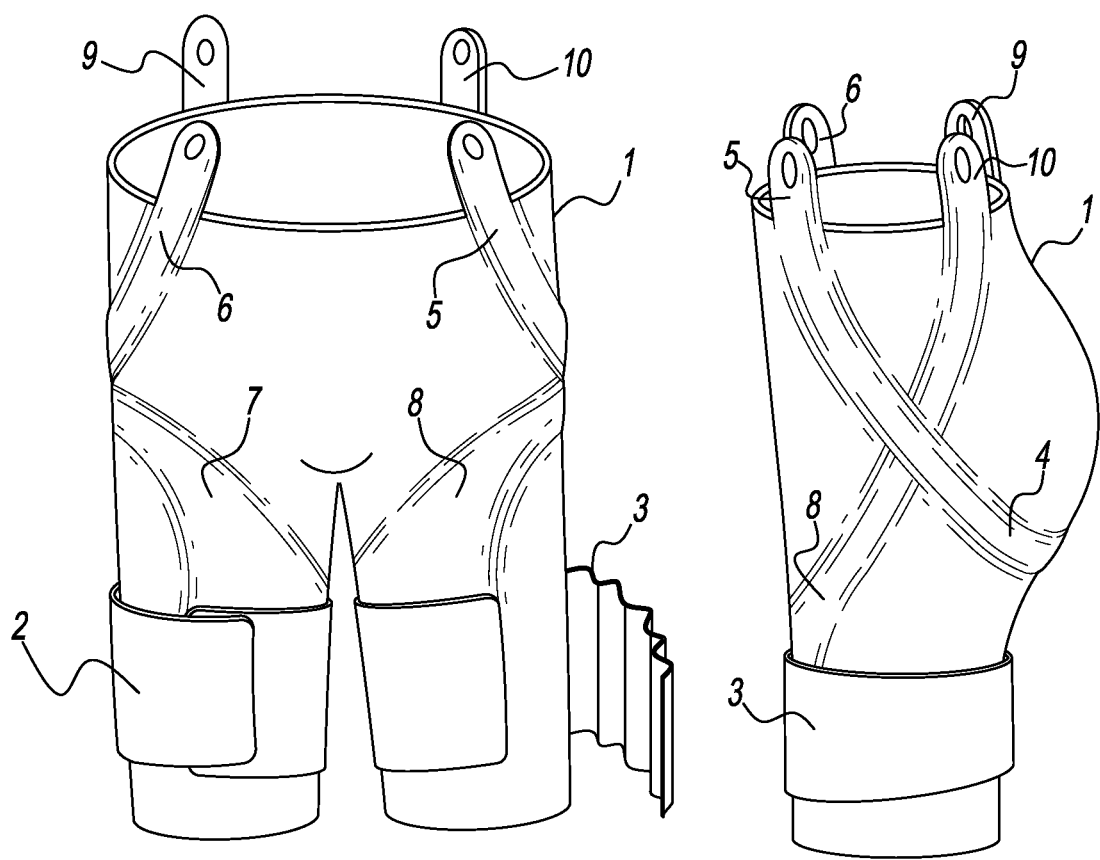
FIG. 1A shows a front view of an example of the garment.
FIG. 1B shows a side view of an example of the garment.
Figure 1C:
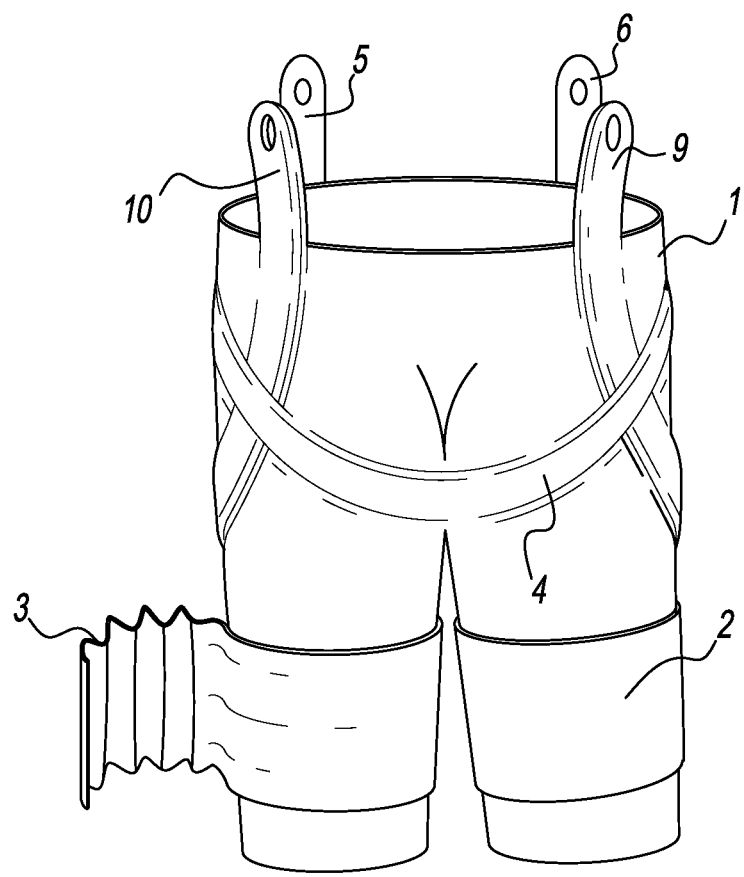
FIG. 1C shows a rear view of an example of the garment.
Figure 2:
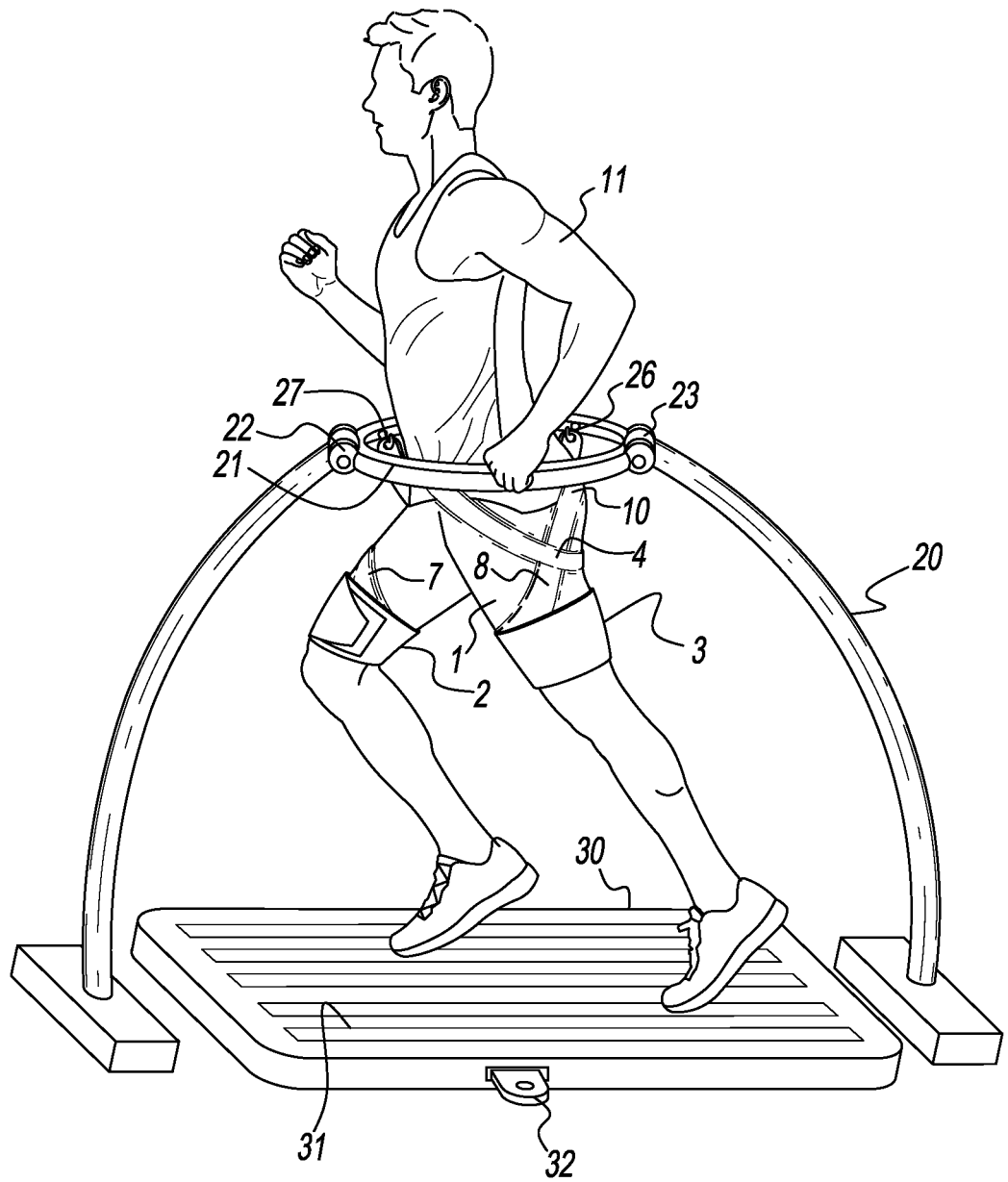
FIG. 2 is an example exercise apparatus depicted in use.

An example of an exercise apparatus is depicted in FIG. 2. Support ring 21 surrounds a user 11 at waist level and is vertically movable by hinges 21 and 23. With reference to FIGS. 1A through 1C, garment 1 wearable by user comprises a posterior band 4, a left leg anterior band 8, and a right leg anterior band 7. Garment 1 is attachable to support ring 21 such that lifting the support ring suspends the user above the ground. The user is lifted and fixed in place by the support ring, but elasticity of the garment allows ambulatory movement. Because the combination of the garment and frame bear the user's weight, the user moves without strain on the lower body.

Figure 4:
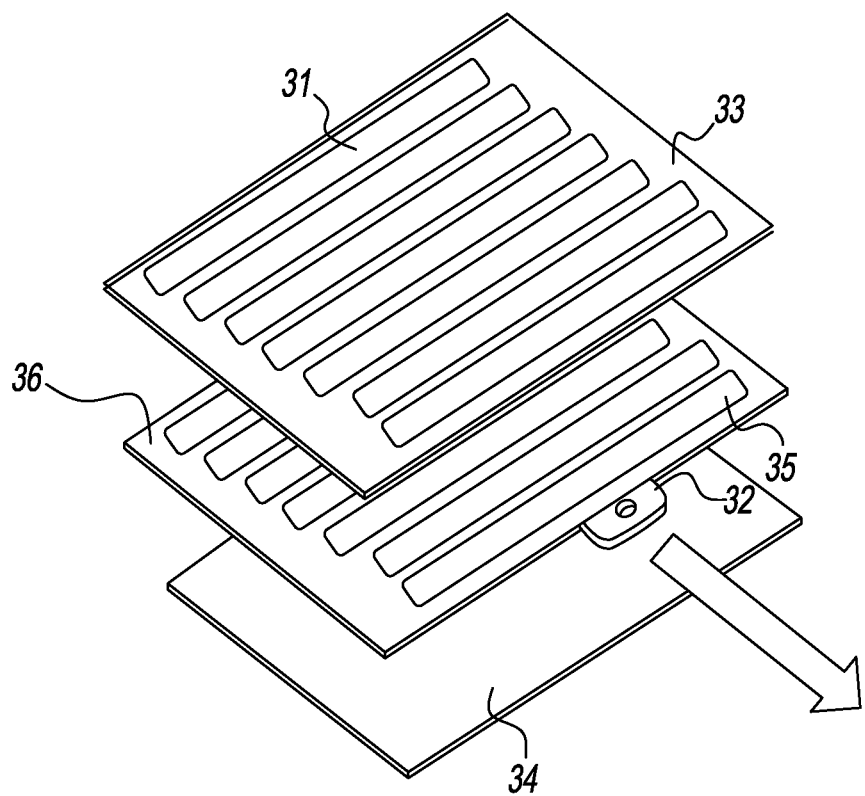
FIG. 4 is an example of a friction-adjustable plate.

FIG. 2 shows a friction-adjustable plate 30 positioned under the user's feet. Because the friction of the pad 30 is adjustable, resistance can be added or subtracted to change the way the user's feet slide over the pad. The friction-adjustable plate comprises a low-friction surface, such as a surface that has been coated with dry film lubricant, wherein friction can be increased by the introduction of a high-friction material such as rubber or felt. A cloth foot garment may further decrease the coefficient of friction between the user's feet and the friction-adjustable plate. An example of a friction-adjustable plate is shown in FIG. 4, comprising a first layer 33 with openings 31 and a high-friction section 33, and a second layer 36 with high-friction sections 35 and low-friction section 36. The second layer 36 is slidable under the first layer 33 such that the high-friction section can be exposed through openings 31. Increasing the level of exposure of the low-friction section 36 through openings 31 results in increasing the resistance against the user's feet, while exposing only the high-friction section 35 results in decreasing resistance. An alternative to the two-layer friction-adjustable plate is a single-layer friction-adjustable plate comprising a low-friction material and vertical strips of high-friction material, such that rotating the plate results in increasing the amount of friction against the user's feet.

An example of the attachable garment 1 is shown in three views in FIGS. 1A through 1C. The garment 1 comprises a posterior band 4, a left leg anterior band 8, and a right leg anterior band 7. The posterior band 4 lifts the user's posterior from the front side of the user's waist, extending from under the buttocks to the user's front, where the posterior band 4 can be attached to the support ring 21. The anterior bands 7 and 8 extend from the user's right and left front thigh to the back side of the user's waist, where the anterior bands 7 and 8 are attachable to the support ring 21. The posterior and anterior bands counterbalance each other, due to the fact that they extend from the front of the frame to the back of the user, and the back of the frame to the front of the user, criss-crossing at the user's side. The user's center of gravity is maintained above the ground and the user does not tip forward or backwards when elevated off the ground by the frame. Furthermore, because the bands are less elastic than the rest of the garment, their attachment to the frame creates a structure that lifts the user from the garment itself, distributing the user's weight to the frame evenly and comfortably.

Right and left anterior bands 7 and 8 are securable around the leg via right and left braces 2 and 3, respectively. Braces 2 and 3 are coupled to anterior bands 7 and 8, respectively, such that when the garment is attached to the frame, the user is lifted by the anterior bands pulling the user up from the braces. By hoisting the user by the thighs and the user's weight being distributed to the frame via the bands, pressure is alleviated from the crotch, which would typically receive the force of the garment as the garment is hoisted by the frame. Moreover, the right and left braces 2 and 3 may be adjustable to accurately fit the user and to allow the user to adjust for comfort. The braces may be adjustable according to many forms currently known in the art, such as by Velcro as depicted in FIGS. 1A through 1C.

In the preferred embodiment, the garment 1 comprises a cloth or cloth-like fabric that is elastic to allow the user full range of movement. The posterior 4 and/or anterior bands 7 and 8 comprise a less elastic material than the rest of the garment 1, to facilitate weight distribution. For instance, one or more of the posterior and anterior bands may be comprised of materials such as limited-stretch polyester or nylon. Posterior and/or anterior bands may be comprised of a denser weave than the rest of the garment 1, or the bands may be reinforced with a less elastic material, or the bands may be sewn into the rest of the garment.

The garment may be attachable to the frame by a variety of known means suitable for hoisting human weight, such as hooks, carabiners, and cam buckles. In the example depicted in FIGS. 1 through 3, posterior band 4 is attachable at the front section of ring 21 at attachment points 25 and 27, anterior band 7 is attachable at the rear section of ring 21 at attachment point 26, and anterior band 8 is attachable at the rear section of ring 21 at attachment point 24. Ring 21 surrounds the user at waist level, and is vertically movable such that the user 11 is lifted by the garment attached to ring 21.

Figure 3A:
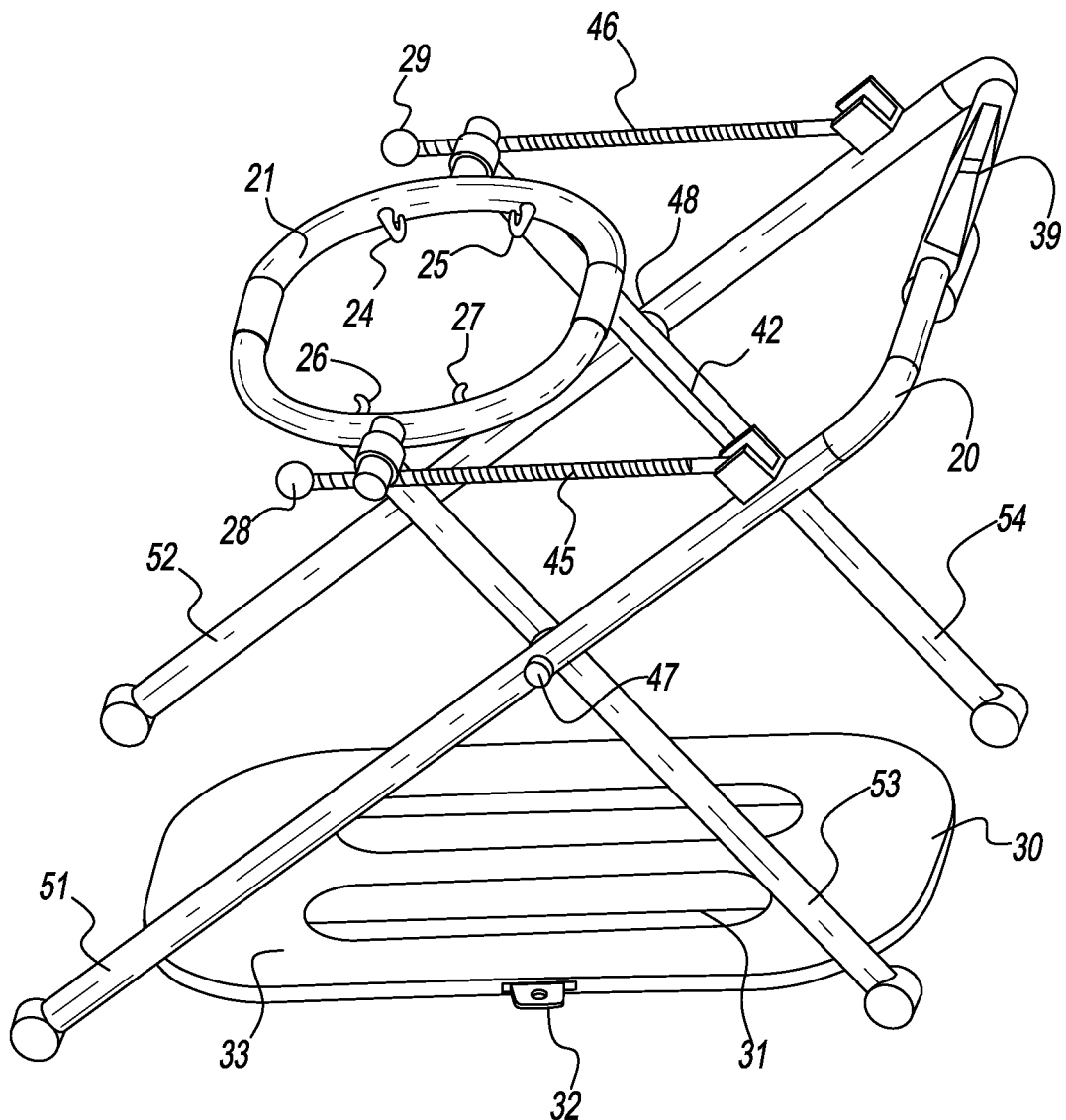
FIG. 3A is an example of a collapsible suspension frame in an expanded position.
Figure 3B:
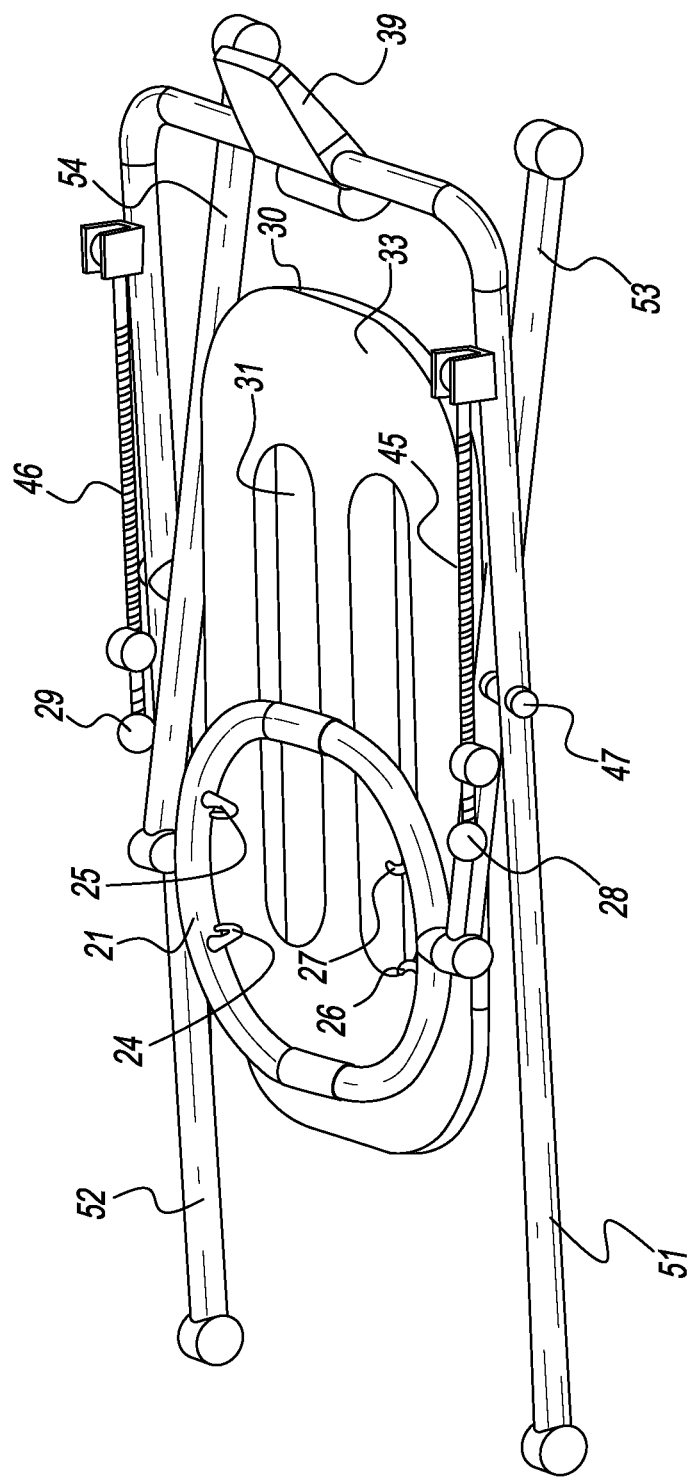
FIG. 3B is an example of a collapsible suspension frame in a collapsed position.

The frame is vertically movable to suspend the user off of the ground, and lowerable to allow the user to step into the ring 21 with minimal effort. For instance, hinges 22 and 23 can be used to raise and lower the front and rear legs of the frame. In the preferred embodiment, the frame is collapsible as depicted in FIGS. 3A and 3B. A right ring support 53 is rotatably connected by pin connection 47 to the right leg 51 of frame 20, while left ring support 54 is rotatably connected by pin connection 48 to the left leg 52 of frame 20, such that frame 20 is vertically movable by rotation of the supports and legs in their pin connections. By forcing frame 20 away from the right and left ring supports 53 and 54, actuator rods 45 and 46 rotate the supports and legs in their pin connections to vertically move support ring 21. The actuator rods 45 and 46 can be operated manually using rotatable knobs 28 and 29, as depicted, or they can automatically operated. Electronic control unit 39 may be used to facilitate automatic operation of the frame.

The frame is elevatable to fully suspend the user off of the ground such that the user can walk or run over the ground with less joint and muscle strain. As such, the frame only needs to be capable of suspending the user up to 5 inches off of the ground. The low-friction surface 30 allows the user to ambulate in place within a stationary frame, but the frame 20 may also comprise a front and rear wheel such that the user can push against the ground and move with the wheeled frame with reduced body weight on the user's legs.

The invention claimed is:

1. A mobility device comprising a suspension frame and a garment wearable by a user and attachable to the suspension frame, the suspension frame comprising: two right-side supports forming a right X-frame wherein the two right-side supports are rotatably connected at their intersection; two left-side supports forming a left X-frame wherein the two left-side supports are rotatably connected at their intersection; a right-side actuator operable to expand and contract the two right-side supports thereby causing the right X-frame to raise and/or lower the suspension frame; and a left-side actuator operable to expand and contract the two left-side supports thereby causing the left X-frame to raise and/or lower the suspension frame; the garment comprising:
   a. an elastic fabric;
   b. a posterior panel supporting a lower portion of the buttocks of the user in an upright position and extending to the front waist of the user;
   c. a left anterior panel extending from the rear left waist to the front left thigh of the user, and coupled to a left brace encircling the user's left thigh; and
   d. a right anterior panel extending from the rear right waist to the front right thigh of the user, and coupled to a right brace encircling the user's right thigh;
   e. wherein the posterior panel, the left anterior panel and the right anterior panel are comprised of at least one material of lesser elasticity than that of the elastic fabric.

2. The garment of claim 1 attachable to the suspension frame wherein the suspension frame is vertically movable to lift the user off of the ground.

3. The garment of claim 2 wherein the left and the right braces are adjustable to fit the user's thighs such that the user is lifted from the left brace and the right brace when the suspension frame lifts the user off of the ground.

\* \* \* \* \*